(12) United States Patent
McClung

(10) Patent No.: US 7,764,960 B2
(45) Date of Patent: Jul. 27, 2010

(54) SYSTEM AND METHOD FOR COMMUNICATION USING A WIRELESS HANDSET IN WIRELESS AND WIRED NETWORKS

(75) Inventor: Michael H. McClung, Ruckersville, VA (US)

(73) Assignee: Cisco Technology, Inc., San Jose, CA (US)

( * ) Notice: Subject to any disclaimer, the term of this patent is extended or adjusted under 35 U.S.C. 154(b) by 766 days.

(21) Appl. No.: 11/173,032

(22) Filed: Jul. 1, 2005

(65) Prior Publication Data

US 2007/0004400 A1    Jan. 4, 2007

(51) Int. Cl.
  *H04W 4/00*      (2009.01)
  *H04B 1/40*      (2006.01)

(52) U.S. Cl. ................... 455/426.1; 455/74.1

(58) Field of Classification Search ........... 455/426, 455/406, 74.1, 426.2, 554.1, 554.2, 555, 455/552.1, 435.1; 370/331; 379/399.01
See application file for complete search history.

(56) References Cited

U.S. PATENT DOCUMENTS

| | | | | |
|---|---|---|---|---|
| 6,011,975 | A |  | 1/2000 | Emery et al. ............... 455/456 |
| 6,073,031 | A |  | 6/2000 | Helstab et al. ............. 455/557 |
| 6,256,519 | B1 |  | 7/2001 | Newton ...................... 455/572 |
| 6,389,299 | B1 |  | 5/2002 | Park ........................... 455/554 |
| 6,400,964 | B1 |  | 6/2002 | Zicker et al. ............... 455/553 |
| 6,600,734 | B1 |  | 7/2003 | Gernert et al. ............. 370/352 |
| 6,611,681 | B2 |  | 8/2003 | Henderson .................. 455/413 |
| 6,754,483 | B2 |  | 6/2004 | Beamish et al. ............ 455/410 |
| 6,775,522 | B2 | * | 8/2004 | Schornack et al. ......... 455/74.1 |
| 6,904,031 | B1 |  | 6/2005 | Ramaswamy et al. ...... 370/337 |
| 6,952,584 | B2 | * | 10/2005 | Adamany et al. ......... 455/435.1 |
| 7,082,306 | B2 | * | 7/2006 | Himmel et al. ............. 455/445 |
| 7,194,083 | B1 | * | 3/2007 | Tischer et al. .......... 379/399.01 |
| 2002/0193107 | A1 | * | 12/2002 | Nascimento, Jr. ........... 455/426 |
| 2003/0108002 | A1 |  | 6/2003 | Chaney et al. .............. 370/261 |
| 2003/0134630 | A1 |  | 7/2003 | Scheinert et al. ........... 455/422 |
| 2003/0188319 | A1 |  | 10/2003 | Weissman .................. 725/106 |
| 2004/0072544 | A1 | * | 4/2004 | Alexis ....................... 455/74.1 |
| 2004/0196810 | A1 | * | 10/2004 | Kil et al. .................... 370/331 |
| 2004/0202303 | A1 |  | 10/2004 | Costa-Requena et al. ..................... 379/205.01 |
| 2005/0020241 | A1 |  | 1/2005 | Holland et al. ........... 455/404.1 |
| 2005/0048948 | A1 | * | 3/2005 | Holland et al. ........... 455/404.1 |
| 2006/0018272 | A1 | * | 1/2006 | Mutikainen et al. ........ 370/328 |

OTHER PUBLICATIONS

Notification of Transmittal of the International Search Report and the Written Opinion of the International Searching Authority, or the Declaration in International Application No. PCT/US2006/021924, dated Oct. 31, 2007, 11 pages.

* cited by examiner

*Primary Examiner*—George Eng
*Assistant Examiner*—Michael Faragalla
(74) *Attorney, Agent, or Firm*—Baker Botts L.L.P.

(57) ABSTRACT

A method for providing communication service includes detecting that a wireless handset has been decoupled from a base, wherein the base is associated with a plurality of communication addresses. The method also includes identifying one or more of the plurality of communication addresses to be associated with the wireless handset, in response to detecting the wireless handset has been decoupled from the base, and transmitting a registration to a registrar. The registration identifies the wireless handset and one or more of the identified communication addresses.

34 Claims, 5 Drawing Sheets

US 7,764,960 B2

SYSTEM AND METHOD FOR COMMUNICATION USING A WIRELESS HANDSET IN WIRELESS AND WIRED NETWORKS

TECHNICAL FIELD OF THE INVENTION

This invention relates in general to communication systems and, more particularly, to a method and system for communication with a mobile handset.

BACKGROUND OF THE INVENTION

As the availability and use of telecommunication services has expanded over the years, the need for powerful, but adaptable communication devices has also increased. Service in many locations is provided by a patchwork of wired and wireless communication networks. Because both wired and wireless communication devices may provide certain benefits, the ability to operate a particular communication device in both a wired and wireless capacity may, as a result, be very beneficial. Additionally, if a user is engaged in an active call during a transition from wired to wireless operation or from wired to wireless operation, it may be desirable to execute the transition in a manner that allows the user to continue the conversation despite the transition.

SUMMARY OF THE INVENTION

The present invention provides a method and system for communication utilizing a wireless handset that substantially eliminates or reduces at least some of the disadvantages and problems associated with previous methods and systems.

In accordance with a particular embodiment, method for providing communication service includes detecting that a wireless handset has been decoupled from a base, wherein the base is associated with a plurality of communication addresses. The method also includes identifying one or more of the plurality of communication addresses to be associated with the wireless handset, in response to detecting the wireless handset has been decoupled from the base, and transmitting a registration to a registrar. The registration identifies the wireless handset and one or more of the identified communication addresses.

In accordance with another embodiment, a method for providing communication service includes detecting that a wireless handset has been coupled to a base, wherein the wireless handset is associated with one or more communication addresses. The method also includes identifying one or more of the communication addresses to be associated with the base in response to detecting the wireless handset has been decoupled from the base, and transmitting a registration to a registrar, wherein the registration identifies the base and one or more of the identified communication addresses.

Technical advantages of particular embodiments of the present invention include methods and systems for processing that provide increased flexibility in the use of wireless and wired communications. Particular embodiments may also support techniques for transitioning ongoing calls from wired communication to wireless communication and/or from wireless communication to wired communication. Particular embodiments may also incorporate techniques for the reconfiguration of components that provide greater interoperability and reuse of components. These techniques may result in more efficient use of time and resources.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
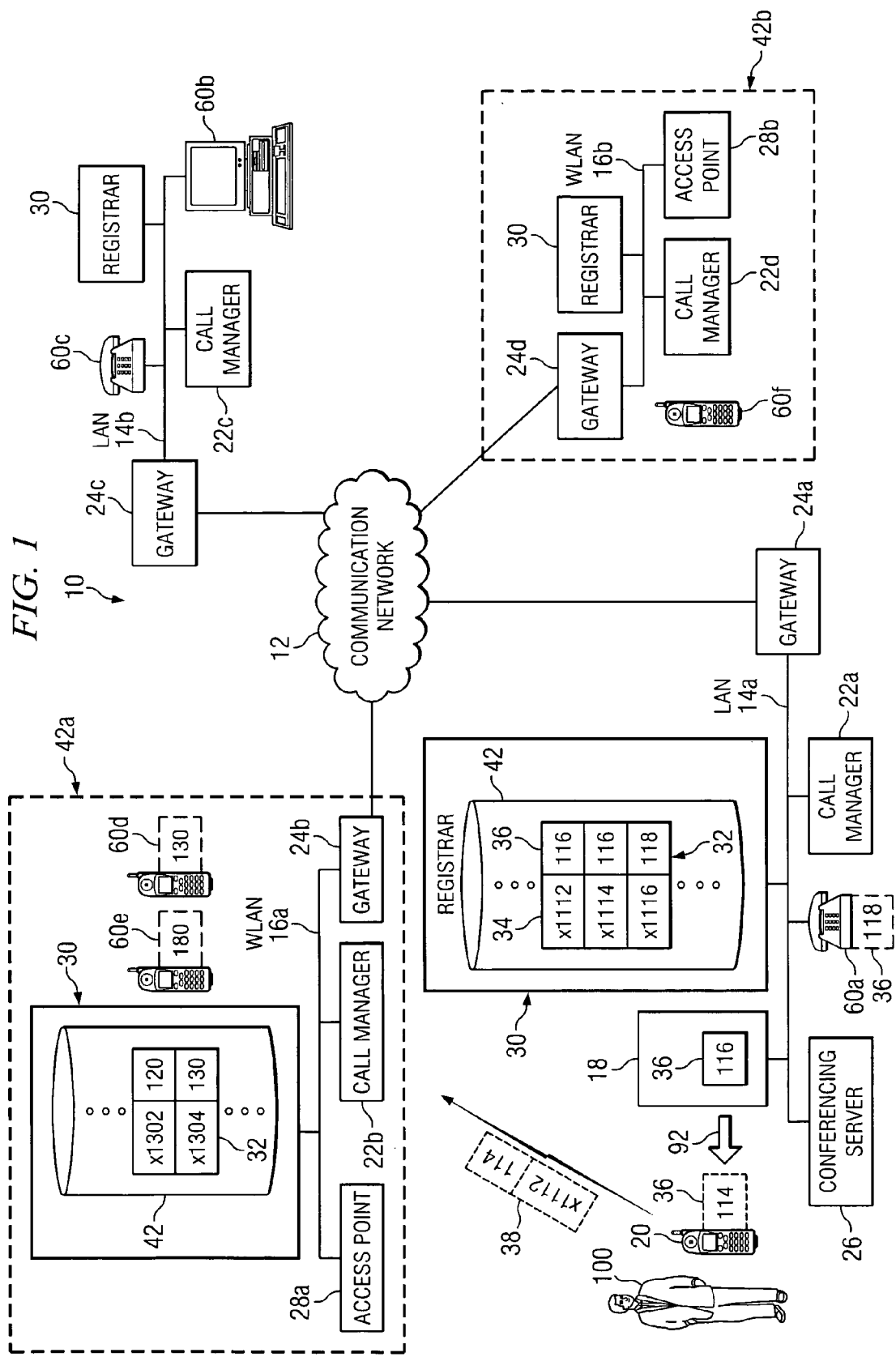
FIG. 1 illustrates the contents and an example operation of a particular embodiment of a communication system according to a particular embodiment of the present invention.

FIG. 1 illustrates a particular embodiment of a communication system 10 operable to facilitate communication between various communication devices 60 of the system. As illustrated in FIG. 1, communication system 10 includes a wireless handset 20, a wired base 18, a plurality of communication devices 60, a plurality of local area networks (LANs) 14, a plurality of wireless local area networks (WLANs) 16, and a communication network 12. A user 100 utilizes wireless handset 20 and/or wired base 18 to communicate with communication devices 60 over LANs 12 and WLANs 14. As described in greater detail below, wireless handset 20 and wired base 18 may operate while coupled to one another allowing user 100 to utilize features or components of either. Furthermore, wireless handset 20 and wired base 18 may also operate independently allowing user 100 significant flexibility to transition between wired and wireless communication.

Wireless handset 20 provides communication service to user 100. Wireless handset 20 is capable, when coupled to a wired base 18, of communicating over a wired connection between that wired base 18 and one of the plurality of LANs 14 in communication system 10. Additionally, wireless handset 20 is configurable, when decoupled from wired base 18, to communicate wirelessly over one or more WLANs 16 in communication system 10. Wireless handset 20 may include any appropriate components to allow wireless handset 20 to couple, directly or indirectly, to wired base 18 and to communicate with or through wired base 18, such as a port, plug, contact, antenna, and/or any other suitable components. Additionally, wireless handset 20 may include antennas, transceivers, receivers, transmitters, and/or any other appropriate components to allow wireless handset 20 to communicate wirelessly with appropriate elements of WLANs 16, such as access points 28. Wireless handset 20 may also include any appropriate collection of user interface components including, but not limited to, a speaker, a microphone, a keypad, and a display to facilitate communication. The contents and operation of a particular embodiment of wireless handset 20 are described in greater detail with respect to FIG. 2. Although described for the sake of simplicity as a "handset," wireless handset 20 may represent a device or component configured to be carried and/or operated by the user in any appropriate manner. As a result, in particular embodiments, wireless handset 20 may represent an earpiece, a headset, and/or any other appropriate component suitable to provide the described functionality.

Figure 2:
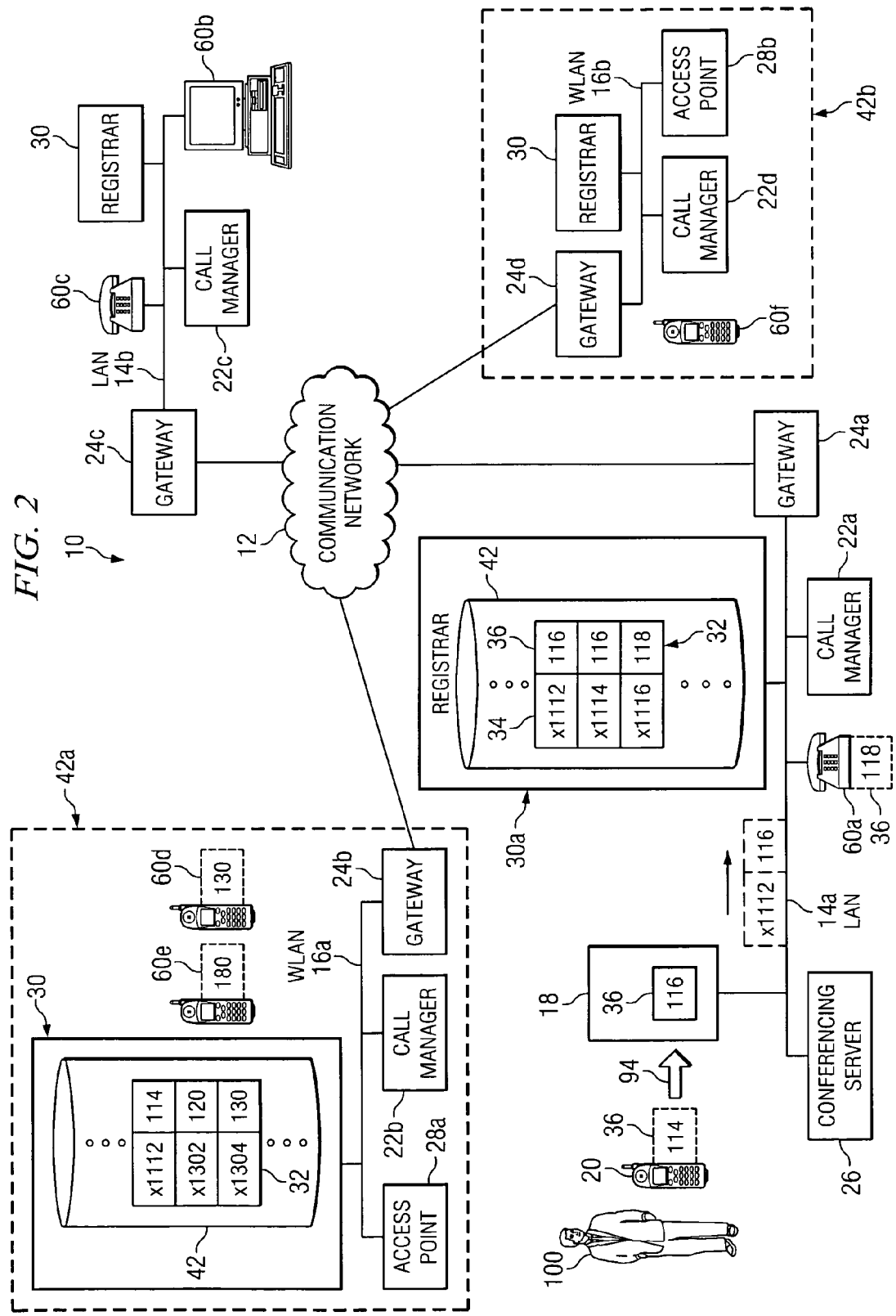
FIG. 2 further illustrates the contents and an example operation of a particular embodiment of the communication system shown in FIG. 1.

Wired base 18 provides wireless handset 20 a wired connection to an associated LAN 14. Wired base 18 may include any appropriate components to allow wired base 18 to couple, directly or indirectly, to wireless handset 20, such as a port, plug, contact, antenna, and/or any other suitable components. Wired base 18 may also include appropriate components, such as a network interface card (NIC), to allow wired base 18 to couple to a particular LAN 14 and to facilitate communication between wired base 18 and other devices coupled to that LAN 14. Additionally, wired base 18 may include one or more user interface components to allow user 100 to interact with wired base 18 and/or communicate with other users of communication system 10. Consequently, wired base 18 may include any appropriate collection of user interface components including, but not limited to, a speaker, a microphone, a keypad, and a display to facilitate communication. The contents and operation of a particular embodiment of wired base 18 are described in greater detail with respect to FIG. 3. Although FIGS. 1 and 2 illustrate particular embodiments of communication system 10 that include a single wired base 18, alternative embodiments of communication system 10 may include multiple wired bases 18.

Communication network 12 provides connectivity between components coupled to communication network 12 using any appropriate communication protocols. Communication network 12 may represent any hardware and/or software configured to communicate information in the form of packets, cells, frames, segments and/or other portions of data. Communication network 12 may include routers, hubs, switches, gateways, call controllers, and/or any other suitable components in any suitable form or arrangement. In general, communication network 12 may represent any combination of public or private communication equipment such as elements of the publicly-switched telephone network (PSTN), a global computer network such as the Internet, a LAN, a WLAN, a wide-area network (WAN), or any other appropriate communication equipment.

LANs 14 support communication between components of communication system 10 connected to LANs 14 through wired connections. In particular, LANs 14 connect wired base 18 and communication devices 60 to one another and to other elements of communication system 10 that facilitate communication between wired base 18 and communication devices 60. LANs 14 comprise any suitable communication links that support packet-based communications and may include bridges, switches, and/or any appropriate hardware and or software to support packet-based communication between the connected components.

WLANs 16 are each capable of supporting communication between wireless handset 20 and communication devices 60 whiles wireless handset 20 is operating wirelessly within a geographic area 42 associated with that WLAN 16. WLANs 16 may comprise any suitable communication links to support packet-based communications and may include routers, hubs, switches, gateways, call controllers, and/or any other appropriate components, in any suitable form or arrangement, to support communication between components of WLANs 16. Additionally, WLANs may include antennas, wireless receivers, wireless transmitters, access points, base stations, and/or any other appropriate components, in any suitable form or arrangement, to support wireless communication between components of WLANs 16 and appropriately-configured communication devices 60 and/or wireless handset 20. As shown in FIG. 1, WLANs 16 each include a gateway 24, a call manager 22, and an access point 28. Furthermore, although FIG. 1 illustrates a particular embodiment of communication system 10 that includes particular types of networks, specifically LANs 14 and WLANs 16, communication system 10 may include any appropriate types and numbers of networks.

Gateways 24 comprise any suitable combinations of hardware and/or software that perform translation functions to facilitate seamless communication between communication network 12 and LANs 14 or WLANs 16. These functions may include translation between transmission formats and between communications procedures. Gateways 24 may also translate between audio and video CODECs. Additionally, gateways 24 may perform call setup and clearing on both the LAN or WLAN side and the communication network side. For example, a particular gateway 24 may interface communication network 12 with a call manager 22 coupled to a LAN 14 associated with the gateway 24. As a result, when a call is received by the gateway 24 from a communication device 60 connected to a different LAN 14, the gateway 24 may translate the call format of the call to a call format associated with the call manager 22 of the LAN 14 associated with that gateway 24.

Call managers 22 establish connections between wireless handset 20 or wired base 18 and communication devices 60. Call managers 22 may each comprise any suitable combination of hardware and/or software operable to establish a connection between a calling component of communication system 10 and a called component. In a particular embodiment, call managers 22 comprise Voice Over Internet Protocol (VoIP) servers that perform the functions of signaling and session management within a packet telephony network. The signaling functionality of call managers 22 allows call information to be carried across network boundaries. The session management functionality of call managers 22 provides the ability to control the attributes of an end-to-end call across multiple networks in communication system 10. In a particular embodiment, the VoIP protocols supported by call managers 22 comprise Session Initiation Protocol (SIP). In such embodiments, call managers 22 may comprise SIP proxy servers and/or SIP application servers that handle call processing, SIP requests, and SIP responses. Although the following description of call managers 22 is detailed with respect to SIP, it should be understood that call managers 22 may support other IP telephony protocols instead, such as the H.323 protocol. In particular embodiments, call managers 22 may also provide a number of telephony services for communication devices 60 and other devices located in LAN 14, including, but not limited to, call forwarding, teleconferencing, network monitoring, and codec translation.

Registrars 30 each maintain a registry 32 that associates communication addresses 34 with devices of communication system 10 to facilitate communication of information to and from these communication addresses 34. In particular embodiments, registrars 30 are each coupled to a particular LAN 14 or WLAN 16 and associate appropriate communication addresses 34 with devices of communication system 10 that couple to that LAN 14 or WLAN 16. Registrars 30 may update registry 32 based on registrations 38 received from wireless handset 20, wired base 18, and communication devices 60, specifying communication addresses 34 to be associated with the registering devices. Additionally, registrars 30 may exchange information relating to the associations maintained by registrars 30 so that as registrars 30 update registries 32 the updated information is shared with other registrars 30 in communication system 10. In particular embodiments, registrars 30 comprise SIP registrars that update registries 32 based on information included in SIP REGISTER messages received from various devices of communication system 10. In such embodiments, the SIP REGISTER messages may specify a device identifier 36 for the device that transmitted the REGISTER message, such as an IP address, and one or more communication addresses 34, such as a SIP addresses-of-record, to be associated with the relevant device. Although shown as a discrete element of communication system 10, in particular embodiments, registrar 30 may comprise all or a portion of call manager 22.

Conferencing servers 26 support teleconferences and other multi-party communication sessions (referred to here collectively as "conference calls") and may provide mixing, bridging, synchronization, and/or any other appropriate functionality associated with multi-party communication. In particular embodiments, wired base 18, wireless handset 20, and/or any other appropriate element of communication system 10 may initiate a conference call on a particular conferencing server 26 by placing a call to the conferencing server 26 and then identifying the conferencing server 26 to other elements of communication system 10 that the initiating element determines should be invited to the conference call. In particular embodiments that support SIP, the initiating element may identify the conferencing server 26 to other elements by transmitting a SIP INVITE message to the invited elements that includes an address for the conferencing server 26 and a call identifier that identifies the conference call being initiated. Although FIG. 1 illustrates a particular embodiment of communication system 10 that includes only one conferencing server 26 coupled to a LAN 14a, communication system 10 may, in particular embodiments, include any number of conferencing servers 26 or other conferencing components coupled to any of LANs 14 or WLANs 16 or communication network 12.

Access points 28 represent communications equipment, including hardware and any appropriate controlling logic, for providing wireless access to WLANs 16. In particular embodiments, access points 28 may each include a radio-frequency transceiver capable of generating and converting radio-frequency signals and an antenna capable of transmitting radio-frequency signals to wireless handset 20 and receiving radio-frequency signals from wireless handset 20. Access point 28 may be configured to utilize 802.11, Bluetooth, and/or any other appropriate wireless communication protocol.

Communication devices 60 each represent any suitable combination of hardware, software, and/or encoded logic to provide communication services to users of communication devices 60. For example, communication devices 60 may represent telephones, computers running telephony software, video monitors, cameras, or any other communication hardware, software, and/or encoded logic that supports the communication of voice, video, text or other suitable forms of data using communication system 10. Although FIG. 1 illustrates a particular number and configuration of communication devices 60, communication system 10 contemplates any number and arrangement of such components to support communication for any number of users.

In operation, wireless handset 20 provides communication service to user 100 through one or more communication addresses 34 associated with wireless handset 20. For the purposes of this description and the claims that follow, user 100 may communicate "through" a particular communication address 34 by receiving calls to that communication address 34 or initiating calls from that communication address 34. Moreover, such calls may represent any audio, video, and/or text-based communication sessions and may include signals, data or messages transmitted through voice devices, text chat, web sessions, facsimile, instant messaging, and/or e-mail.

In particular embodiments, wireless handset 20 is capable of operating in two different modes. While coupled to wired base 18, wireless handset 20 may communicate on a particular LAN 14 through a wired connection between wired base 18 and the LAN 14. While decoupled from wired base 18, wireless handset 20 may communicate through a wireless connection between wireless handset 20 and elements of a particular WLAN 16. For the purpose of this description and the claims that follow, wireless handset 20 may be coupled to wired base 18 through a physical connection between wireless handset 20 and wired base 18 or through any other appropriate connection that allows wireless handset 20 and wired base 18 to communicate directly with one another. For example, in particular embodiments, wireless handset 20 may operate as a cordless phone when within a geographic area associated with wired base 18 and may couple to wired base 18 through a cordless, radio-frequency (RF) communication link between wireless handset 20 and wired base 18.

Wireless handset 20 begins the example illustrated by FIG. 1 coupled to wired base 18. While wireless handset 20 and wired base 18 are coupled, user 100 may utilize features and functionality provided by any combination of the hardware and/or software included in wireless handset 20 and wired base 18. As a result, in particular embodiments, user 100 may be able to benefit from the portability of wireless handset 20 when the two components are decoupled but also be able to benefit from the larger feature set offered by particular embodiments of wired base 18 when the two components are coupled. As one example, in particular embodiments, wired base 18 may be bigger than wireless user 100 and may, as a result, include a larger display and keypad that those on wireless handset 20. User 100 may choose to utilize the larger keyboard or display incorporated in wired base 18 while the two components are coupled. As another example, wired base 18 may include a telephone directory for other users that connect to a local area network (LAN) through which wired base 18 connects to communication network 12. User 100 may be able to search this telephone directory while wireless handset 20 is coupled to wired base 18.

User 100 may communicate with users of other communication devices 60 through communication addresses 34 associated with either of wireless handset 20 or wired base 18 while the two components are coupled. In particular embodiments, wired base 18 is associated with one or more communication addresses 34 while wireless handset 20 and wired base 18 are coupled, and wireless handset 20 is not associated with any communication addresses 34 while the two elements are coupled.

User 100 may, at an appropriate time during operation, decouple wireless handset 20 from wired base 18 as shown in FIG. 1 by arrow 92. For the purposes of this description and the claims that follow, user 100 may decouple wireless handset 20 from wired base 18 by physically disconnecting wireless handset 20, by moving wireless handset 20 outside a geographic area in which cordless operation with wired base 18 is possible and/or effective, and/or by terminating a physical coupling and/or any other appropriate connection between wireless handset 20 and wired base 18 in any other suitable manner. Depending on the configuration of communication system 10, wireless handset 20 and/or wired base 18, in particular embodiments, may be capable of detecting the fact that wireless handset 20 has been decoupled from wired base 18. In particular embodiments, wireless handset 20 and/or wired base 18 may be capable of receiving an indication from user 100 that user 100 has decoupled wireless handset 20 or soon will decouple wireless handset 20. For example, user 100 may press a button on wireless handset 20 or wired base 18 before or after decoupling wireless handset 20 from wired base 18. Thus, for the purposes of this description and the claims that follow, wireless handset 20 or wired base 18 may detect that wireless handset 20 has been decoupled by detecting the actual decoupling of wireless handset 20 from wired base 18, by detecting receipt of an indication that user 100 has decoupled wireless handset 20 or will soon decouple wireless handset 20, and/or by detecting the occurrence of any other suitable event associated with decoupling of wireless handset 20 from wired base 18. Moreover, the event detected by wireless handset 20 or wired base 18 may occur before, concurrently with, or after the actual decoupling of wireless handset 20 and wired base 18.

If, while operational, user 100 decouples wireless handset 20 from a wired base 18 to which wireless handset 20 is coupled, wireless handset 20 may execute particular steps to allow wireless handset 20 to communicate wirelessly over a WLAN 16 associated with the geographic area in which wireless handset 20 is located. For example, in response to detecting that wireless handset 20 has been decoupled from wired base 18, wireless handset 20 may register with registrar 30 for an appropriate WLAN 16, assumed here to be WLAN 16a. As part of registering, wireless handset 20 may identify one or more communication addresses 34, such as email addresses, telephone numbers, telephone extensions, or any other suitable types of communication addresses that call manager currently associates with wired base 18 and that are to be associated with wireless handset 20 as a result of the decoupling. Wireless handset 20 may transmit a registration 38 to registrar 30b through the access point 28 of a particular WLAN 16 and/or execute any other appropriate steps to register with registrar 30b. For example, in particular embodiments, wireless handset 20 may generate a SIP REGISTER message that includes a device identifier 36 associated with wireless handset 20, such as a Media Access Control (MAC) address, and one or more SIP line appearances currently associated with wired base 18. In the illustrated example, wireless handset 20 registers with registrar 30b of WLAN 16a.

In response to receiving registration from wireless handset 20, registrar 30b associates the registered communication addresses 34 with the registered device identifier 36 in registry 32b. Additionally, in particular embodiments, registrar 30b may indicate to other registrars 28 of communication system 10 that the relevant communication addresses 34 are now registered with registrar 30b. Following this registration process, calls placed to the relevant communication addresses 34 will be routed to wireless handset 20 through the WLAN 16b. Additionally, calls initiated by user 100 on wireless handset 20 will be forwarded to the appropriate communication device 60 through call manager 22b.

Furthermore, in particular embodiments, registrars 30 may collectively associate one or more of the communication addresses 34 registered by wireless handset 20 with both wireless handset 20 and wired base 18. For example, registrar 30b of WLAN 16a may, in response to receiving registration 38, associate the registered communication addresses 34 with wireless handset 20 in registry 32b, while registrar 30a of LAN 14a may continue to associate the same communication address 34 with wired base 18 in registry 32a. As a result, in such embodiments, incoming calls to one of these communication addresses may cause both wireless handset 20 and wired base 18 to ring (or otherwise indicate an incoming call) and either element may be used to answer the call.

In alternative embodiments, when registrar 30b receives a registration 38 from wireless handset 20, registrar 30b may notify registrar 30a which may, in turn, cancel a previous registration by wired base 18 of the communication addresses 34 registered by wireless handset 20. As a result, in such embodiments, the registered communication address 34 may be associated exclusively with wireless handset 20 and incoming calls to one of these communication addresses 34 may cause only wireless handset 20 to ring (or otherwise indicate an incoming call). Moreover, in particular embodiments, certain communication addresses 34 may, as a result of registration by wireless handset 20, be registered jointly with wireless handset 20 and wired base 18 while other communication addresses may be registered exclusively with wireless handset 20. In general, any of the communication addresses 34 registered by wireless handset may be associated exclusively with wireless handset 20 or associated jointly with wireless handset 20 and any other appropriate elements of communication system 10, and calls to those communication addresses 34 may be forwarded solely to wireless handset 20 or to wireless handset 20 and any other appropriate elements of communication system 10.

Additionally, prior to, during, or shortly after decoupling wireless handset 20 or wired base 18 may determine that a call is currently active that originated from one of the communication addresses 34 to be transitioned to wireless handset 20 or that was received by one of the communication addresses 34 to be transitioned to wireless handset 20. If so, the relevant component may execute certain steps to ensure that the active call is preserved with minimal disruption and user can continue the active call. The steps executed by the relevant component may depend on the configuration of wireless handset 20 and/or wired base 18 and the characteristics of communication system 10. In general, wired base 18 may take any appropriate steps to ensure that active calls are not disrupted when wired base 18 detects the decoupling of wireless handset 20.

As one example of how wired base 18 may transition an active call from wired base 18 to wireless handset 20, wired base 18 may, in response to detecting the decoupling of wireless handset 20, place a call that is active between wired base 18 and another communication device 60 (assumed for this example to be communication device 60c) on hold. Wired base 18 and wireless handset 20 may be configured to share a line and wireless handset 20 may be able to retrieve whatever call wired base 18 placed on hold. Additionally, in particular embodiments, wired base 18 may "park" the call by placing the call on hold and associating a call identifier with the call. For example, call manager 22a may be responsible for managing calls placed on hold by wired base 18 and other devices in LAN 14a. Wired base 18 may place the active call on hold by notifying call manager 22 that the active call is being placed on hold and providing call manager 22 a call identifier. Call manager 22 may then associate the call identifier with the active call and appropriate elements of communication system 10 may retrieve the held call by communicating the call identifier to call manager 22.

After user 100 decouples wireless handset 20 from wired base 18, wireless handset 20 may retrieve the active call from hold. Wireless handset 20 may retrieve the active call in response to directly detecting that wireless handset 20 has been decoupled from wired base 18, in response to a request from user 100 that wireless handset 20 retrieve the active call, or as a result of any other event or occurrence that indicates that wireless handset 20 has been decoupled from wired base 18. As noted above, in particular embodiments, wired base 18 may place the active call on hold by parking the call with call manager 22 or another appropriate element of communication system 10. In such embodiments, wireless handset 20 may retrieve the active call by communicating the call identifier to call manager 22. As a result, user 100 may be able to complete the active call with limited disruption.

As another example of how wired base 18 may transition an active call to wireless handset 20, wired base 18 may place the active call on hold and initiate a telephonic conference or another appropriate form of multiparty communication session (all of which are referred to here generically as "a conference call" in the singular or "conference calls" in the plural). Wired base 18 may initiate the conference call by contacting conferencing server 26 or any other appropriate conferencing element of communication system 10. In particular embodiments, wired base 18, wireless handset 20, and/or particular communication devices 60 may be capable of hosting conference calls, and wired base 18 may transition the active call from wired base 18 to wireless handset 20, in part, by contacting wired base 18, wireless handset 20, or a particular communication device 60 to initiate a conference call.

Wired base 18 may then identify conferencing server 26 or any other appropriate conferencing element to wireless handset 20 and communication device 60c in any manner appropriate based on the configuration of communication system 10. For example, in particular embodiments, wired base 18 generates a SIP REFER message that identifies conferencing server 26 and transmits the SIP REFER message to communication device 60c. In response to receiving the SIP REFER message, communication device 60c places its connection to the active call on hold and calls the conferencing element identified by the SIP REFER message, conferencing server 26. Wired base 18 may also generate a SIP INVITE message identifying conferencing server 26 and communicate the SIP INVITE message to wireless handset 20. In response to receiving the SIP INVITE message, wireless handset 20 may contact the conferencing element identified by the SIP INVITE message. In particular embodiments, wired base 18 may terminate its connection to conferencing server 26 once both communication device 60c and wireless handset 20 have contacted conferencing server 26, leaving communication device 60c and wireless handset 20 to complete the active call as a conference call hosted by conferencing serer 26. In alternative embodiments, wired base 18 may instead remain connected to conferencing server 26 until completion of the call.

As a third example of how wired base 18 may transition an active call to wireless handset 20, wired base 18 may identify wireless handset 20 to communication device 60c and communication device 60c may contact wireless handset 20 to complete the active call. For example, in particular embodiments, wired base 18 may generate a SIP REFER message that specifies a device identifier 36 for wireless handset 20. In response to receiving the SIP REFER message, communication device 60c may place the active call on hold and initiate a communication session with wireless handset 20 using the device identifier 36 specified by the SIP REFER message. Communication device 60c may then terminate its original connection to wired base 18 and user 100 may complete the call using wireless handset 20.

Thus, wired base 18 may utilize any of several suitable techniques to transition an active call from wired base 18 to wireless handset 20 in response to detecting the decoupling of wireless handset 20. Particular embodiments may use any one or more of the described techniques or any appropriate alternatives to transition active calls between the two elements. Additionally, particular embodiments of wired base 18 may be configured to instead terminate active calls in response to detecting the decoupling of wireless handset 20.

After wireless handset 20 has been decoupled from wired base 18, any active calls have been transitioned from wired base 18 to wireless handset 20, and any appropriate registration has been completed by wireless handset 20, user 100 may communicate over WLAN 16a using wireless handset 20. In particular embodiments, user 100 may both receive calls to communication addresses 34 registered by wireless handset 20 and initiate calls from these communication addresses 34. Additionally, prior to, during, or after the decoupling of wireless handset 20, wireless handset 20 may reconfigure using handset configuration information stored in wireless handset 20. In particular embodiments, handset configuration information may describe, specify, or otherwise provide various settings for use by wireless handset 20 when decoupled from wired base 18. In particular embodiments, this reconfiguration may allow wireless handset 20 to override any base-specific settings configured during coupling to the relevant wired base 18. For example, in particular embodiments, wireless handset 20 is capable of detecting when wireless handset 20 has been decoupled from a wired base 18 and, in response to detecting such a decoupling, wireless handset 20 may load handset configuration information to revert to a wireless operational mode while operating wirelessly. Handset configuration information may include any appropriate information used during operation of wireless handset 20 including dial plans, address books, display settings, lists of preferred service providers, and/or any other appropriate information.

Furthermore, while wireless handset 20 is decoupled from wired base 18, wired base 18 may still provide certain functionality associated with the operation of wireless handset 20. For example, as noted above, one or more communication addresses 34 may remain jointly associated with wired base 18 and calls placed to those communication addresses 34 may be answered at wired base 18. Additionally, wired base 18 may be able to request location information for a particular wireless handset 20 associated with wired base 18. For example, in particular embodiments, when wireless handset 20 is decoupled from wired base 18, a user 100 may request location information (for example, by pressing a "page" button on wired base 18) for the wireless handset 20 associated with wired base 18. In response, wired base 18 may communicate with other elements of communication system 10 to obtain information specifying or describing a location of wireless handset 20.

For example, SIP supports the concept of "event packages", which enable event messages to be defined for a particular application associated with a particular device. A subscribing device can subscribe to a package associated with any other device in a SIP-based communication system 10. The subscribing device may then receive a response indicating the current state of the relevant package for the device in question and may subsequently receive asynchronous updates representing state changes to the relevant package.

Thus, as one example, wired base 18, in a SIP-based communication system 10, may transmit a SUBSCRIBE message to the Location Package of wireless handset 20 whenever a user requests the location of wireless handset 20 and may provide to the user location information received from wireless handset 20 in response to the SUBSCRIBE message. As another example, wired base 18 may subscribe to the Location Package of wireless handset 20 when wireless handset 20 is decoupled from wired base 18, and may locally store information describing the location of wireless handset 20. Wired base 18 may update this information as the Location Package of wireless handset 20 sends updates, and may retrieve this information from the local memory whenever the user requests the location of wireless handset 20. In general, however, wired base 18 may use any appropriate techniques to determine the location of wireless handset 20 based on the configuration of communication system 10.

In addition, while wireless handset 20 is decoupled from wired base 18, user 100 may communicate over WLAN 16*a* as described above. If user 100 moves outside a geographic area associated with WLAN 16*a*, wireless handset 20 may register with a call manager 22 or other appropriate components associated with another WLAN 16 and begin communicating over this new WLAN 16. In particular embodiments, wireless handset 20 may use conventional wireless handoff techniques to seamlessly roam between WLANs 16. Additionally, at any appropriate time during operation, user 100 may couple wireless handset 20 to wired base 18 and operation may proceed as described below.

Thus, wireless handset 20 and wired base 18 provide a flexible system, allowing user 100 to utilize both wired and wireless communication systems as appropriate based on the needs of user 100. Additionally, wireless handset 20 and/or wired base 18 may support techniques to allow user 100 to transition between wired and wireless operation with minimal disruption to ongoing communication. Moreover, in particular embodiments, wireless handset 20 and/or wired base may be easily reconfigured as user 100 transitions from wired to wireless operation providing additional flexibility. As a result, particular embodiments of wireless handset 20 and wired base 18 may provide several operational benefits.

FIG. 2 illustrates example operation of wireless handset 20 as wireless handset 20 operates in a wireless mode. FIG. 2 also illustrates example operation of wireless handset 20 and wired base 18 as wireless handset 20 is coupled to wired base. The embodiment of communication system 10 shown in FIG. 2 includes similar components to the embodiment of communication system 10 shown in FIG. 1.

Wireless handset 20 begins the illustrated example decoupled from wired base 18. As noted above, user 100 may, while wireless handset 20 is decoupled from wired base 18, use wireless handset 20 to communicate with other communication devices 60 over WLANs 16. User 100 may, at an appropriate time during operation in this wireless mode, couple wireless handset 20 to wired base 18 as shown in FIG. 2 by arrow 94. For the purposes of this description and the claims that follow, user 100 may couple wireless handset 20 to wired base 18 by physically connecting wireless handset 20 to wired base 18, by moving wireless handset 20 into a geographic area in which cordless operation with wired base 18 is possible and/or effective, and/or by initiating a physical coupling and/or any other appropriate connection between wireless handset 20 and wired base 18 in any other suitable manner. Furthermore, depending on the configuration of communication system 10, wireless handset 20 and/or wired base 18, in particular embodiments, may be capable of detecting the fact that wireless handset 20 has been coupled to wired base 18. In particular embodiments, wireless handset 20 and/or wired base 18 may be capable of receiving an indication from user 100 that user 100 has coupled wireless handset 20 to wired base 18 or soon will couple wireless handset 20 to wired base 18. For example, user 100 may press a button on wireless handset 20 or wired base 18 before or after coupling wireless handset 20 to wired base 18. Thus, for the purposes of this description and the claims that follow, wireless handset 20 or wired base 18 may detect that wireless handset 20 has been coupled to wired base 18 by detecting the actual coupling of wireless handset 20 to wired base 18, by detecting receipt of an indication that user 100 has coupled wireless handset 20 to wired base 18 or will soon couple wireless handset 20 to wired base 18, and/or by detecting the occurrence of any other suitable event associated with the coupling of wireless handset 20 to wired base 18. Moreover, the event detected by wireless handset 20 or wired base 18 may occur before, concurrently with, or after the actual coupling of wireless handset 20 and wired base 18.

If, while operating in a wireless mode, wireless handset 20 is coupled to a wired base 18, wired base 18 and/or wireless handset 20 may execute particular steps to allow wireless handset 20 to communicate through a wired connection between the wired base 18 and LAN 14*a*. For example, in response to detecting that wireless handset 20 has been coupled to wired base 18, wired base 18 may register one or more communication addresses 34 currently associated with wireless handset 20. Wired base 18 may register the relevant communication addresses 34 by transmitting a registration 38 to the registrar 30 that maintains registry 32 for the LAN 14 to which wired base 18 is coupled, registrar 30*a* in this example. In particular embodiments, wired base 18 may transmit a SIP REGISTRATION message to the appropriate registrar 30 that specifies a device identifier 36 associated with wired base 18 and the communication addresses 34 to be registered.

Furthermore, wired base 18 may determine the appropriate communication addresses 34 to register based on information communicated to wired base 18 by wireless handset 20, based on configuration information stored in wired base 18, or based on any appropriate information, criteria, or factors. As one example, wired base 18 may be configured to operate with a particular wireless handset 20 and may include base configuration information that indicates communication addresses 34 used by that wireless handset 20. In response to receiving registration 38 from wireless handset 20, wired base 18 may register communication address 34 based on base configuration information. As another example, wired base 18 may be configured to operate with multiple wireless handsets 20. In such embodiments, wireless handset 20 may, during or after coupling, communicate one or more communication addresses 34 to wired base 18, and wired base 18 may register the communication addresses 34 communicated by wireless handset 20.

In response to receiving registration from wired base 18, registrar 30*a* associates, in registry 32*a*, the communication addresses 34 specified by registration 38 with the device identifier 36 specified by registration 38. As a result of this association, calls placed to the registered communication addresses 34 will be routed to wired base 18 through LAN 14*a*. Additionally, user 100 may initiate calls from one of the registered communication addresses 34 using wired base 18.

In particular embodiments, registrar 30 may associate one or more of the communication addresses 34 registered by wireless handset 20 with both wireless handset 20 and wired base 18 as described above with respect to FIG. 1, or may associated the registered communication addresses 34 exclusively with wired base 18. As a result, incoming calls to one of these communication addresses may cause both wireless handset 20 and wired base 18 to ring (or otherwise indicate an incoming call) or may cause only wired base 18 to ring (or otherwise indicate an incoming call) depending on the configuration and capabilities of wireless handset 20 and wired base 18. In general, any of the communication addresses 34 registered by wired base 18 may be associated exclusively with wired base 18 or associated jointly with wired base 18 and wireless handset 20 or any other appropriate elements of communication system 10. Additionally, calls to those communication addresses 34 may be forwarded solely to wired base 18 or to wired base 18 and any other appropriate elements of communication system 10.

Additionally, prior to this coupling, wireless handset 20 may determine that an active call is currently ongoing that originated from one of the communication addresses 34 registered by wireless handset 20 or that was received by one of the communication addresses 34 registered by wireless handset 20. If so, wireless handset 20 may execute certain steps to transition the active call from wireless handset 20 to wired base 18 with minimal disruption to allow user 100 to continue the active call. Alternatively, in particular embodiments, wired base 18 may be responsible for detecting that a call is currently active on the relevant communication addresses 34 and for executing steps to ensure that the active call is maintained with minimal disruption. The steps executed by the relevant component may depend on the configuration of wireless handset 20 and/or wired base 18 and the characteristics of communication system 10. In general, wireless handset 20 and/or wired base 18 may take any appropriate steps to ensure that active calls are not disrupted when wireless handset 20 is coupled to wired base 18.

As one example of how wireless handset 20 may transition an active call from wireless handset 20 to wired base 18, wireless handset 20 may, in response to detecting the coupling of wireless handset 20 and wired base 18, place a call that is active between wireless handset 20 and another communication device 60 (assumed here to be communication device 60c) on hold. Wired base 18 and wireless handset 20 may be configured to share a line and wired base 18 may be able to retrieve whatever call wireless handset 20 placed on hold. In particular embodiments, wireless handset 20 may "park" the call by placing the call on hold and associating a call identifier with the call. For example, call manager 22 may be responsible for managing calls placed on hold, and wireless handset 20 may place the active call on hold by notifying call manager 22 that the active call is being placed on hold and providing call manager 22 a call identifier. Call manager 22 may then associate the call identifier with the active call and appropriate elements of communication system 10 may retrieve the held call by communicating the call identifier to call manager 22.

After user 100 couples wireless handset 20 to wired base 18, wired base 18 may retrieve the active call from hold. Wired base 18 may retrieve the active call in response to directly detecting that wireless handset 20 has been coupled to wired base 18, in response to a request from user 100 that wired base 18 retrieve the active call, or as a result of any other event or occurrence that indicates that wireless handset 20 has been coupled to wired base 18. As noted above, in particular embodiments, wireless handset 20 may place the active call on hold by parking the call with call manager 22 or another appropriate element of communication system 10. In such embodiments, wired base 18 may retrieve the active call by communicating the call identifier to call manager 22. As a result, user 100 may be able to complete the active call with limited disruption.

As another example of how wireless handset 20 may transition an active call to wired base 18, wireless handset 20 may place the active call on hold and initiate a conference call. Wireless handset 20 may initiate the conference call by contacting conferencing server 26 or any other appropriate conferencing element of communication system 10. As noted above, in particular embodiments, wired base 18, wireless handset 20, and/or particular communication devices 60 may be capable of hosting conference calls, and wireless handset 20 may transition the active call from wireless handset 20 to wired base 18, in part, by contacting wired base 18, wireless handset 20, or a particular communication device 60 to initiate a conference call.

Wireless handset 20 may then identify conferencing server 26 or any other appropriate conferencing element to wired base 18 and communication device 60c. For example, in particular embodiments, wireless handset 20 generates a SIP REFER message that identifies conferencing server 26 and transmits the SIP invite message to communication device 60c. In response to receiving the SIP REFER message, communication device 60c places its connection to the active call on hold and calls the conferencing element identified by the SIP REFER message, conferencing server 26. Wireless handset 20 may also generate a SIP INVITE message identifying conferencing server 26 and communicate the SIP INVITE message to wired base 18. In response to receiving the SIP INVITE message, wired base 18 may contact conferencing server 26. In particular embodiments, wireless handset 20 may terminate its connection to conferencing server 26 once both communication device 60c and wireless handset 20 have contacted conferencing server 26, leaving communication device 60c and wired base 18 to complete the active call as a conference call hosted by conferencing server 26.

As a third example of how wireless handset 20 may transition an active call to wired base 18, wireless handset 20 may identify wired base 18 to communication device 60c and communication device 60c may contact wired base 18 to complete the active call. For example, in particular embodiments, wireless handset 20 may generate a SIP REFER message that specifies a device identifier 36 for wired base 18. In response to receiving the SIP REFER message, communication device 60c may place the active call on hold and initiate a communication session with wired base 18 using the device identifier 36 specified by the SIP REFER message. Communication device 60c may then terminate its original connection to wireless handset 20 and user 100 may complete the call using wired base 18.

Thus, wireless handset 20 may utilize any of several suitable techniques to transition an active call from wireless handset 20 to wired base 18 in response to detecting the coupling of wireless handset 20 and wired base 18. Particular embodiments may use any one or more of the described techniques or any appropriate alternatives to transition active calls between the two elements. Additionally, particular embodiments of wireless handset 20 may be configured to instead terminate active calls in response to detecting the coupling of wireless handset 20 and wired base 18.

After wireless handset 20 has been coupled to wired base 18, any active calls have been transitioned from wireless handset 20 to wired base 18, and any appropriate registration has been completed by wired base 18, user 100 may communicate over LAN 14a through the wired connection between wired base 18 and LAN 14a, using any appropriate combination of the components and features provided by both wired base 18 and wireless handset 20. In particular embodiments of communication system 10, wireless handset 20 is associated with a particular wired base 18 and may not operate, may not operate properly, or may only operate in a limited capacity when coupled to any other wired base 18 in communication system 10. This may allow only a particular user 100 using a particular wireless handset 20 to couple to a particular wired base 18, allowing communication system 10 to support security features. In alternative embodiments, a particular wireless handset 20 may be able to operate with a plurality of wired bases 18 and/or a particular wired base 18 may be able to operate with a plurality of wireless handsets 20. As a result, in such embodiments wireless handset 20 and wired base 18 may provide significant flexibility to communication system 10.

As one example, a particular wired base 18 may be able to operate in conjunction with multiple wireless handsets 20. As a result, in a setting with a large number of temporary users 100, such as an office lobby or hotel room, a particular wired base 18 may be configured to operate with wireless handsets 20 used by a plurality of visiting users 100. Additionally, wired base 18 may be able to operate with a replacement wireless handset 20 if an original wireless handset 20 is lost or broken.

As another example, wireless handset 20 may be capable of working with a number of wired bases 18 spread throughout communication system 10. This may allow a roaming user 100 to couple to wired bases 18 located in multiple locations within communication system 10. For example, user 100 may decouple wireless handset 20 from a wired base 18 in the user's office, move to a conference room for a meeting, and couple wireless handset 20 to a wired base 18 in the conference room, allowing user 100 to receive calls in the conference room. Additionally, wireless handset 20 may be able to operate with a replacement wired base 18 if an original wireless handset 20 is broken or upgraded.

Wireless handset 20 may be also able to communicate configuration information stored in wireless handset 20 to wired base 18 when coupling to wired base 18. This configuration information may include dial plans, carrier preferences, phone books, communication addresses 34 associated with wireless handset 20, or any other appropriate information that may be used by wired base 18 during operation. As a result, in a setting with a large number of temporary users 100 wireless handset 20 and wired bases 18 may be able to operate in conjunction with wireless handsets 20. Wired bases 18, in such embodiments, may be reconfigurable based on configuration information received from wireless handset 20.

Figure 3:
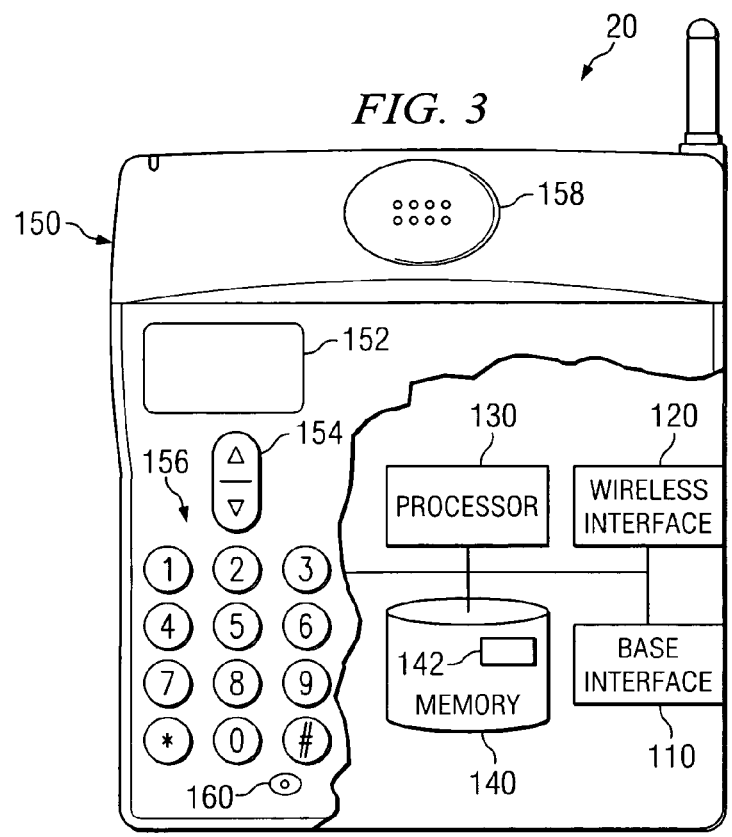
FIG. 3 illustrates contents of a particular embodiment of a wireless handset that may be used for communication in the communication system shown in FIG. 1.

FIG. 3 is a block diagram illustrating the contents of wireless handset 20 according to particular embodiments. As shown, wireless handset 20 includes base interface 110, wireless interface 120, processor 130, memory 140, and user interface 150. Although shown in FIG. 3 as physically discrete elements of wireless handset 20, any two or more of base interface 110, wireless interface 120, processor 130, memory 140, and user interface 150 may represent portions of the same physical component and/or include shared components.

Base interface 110 is capable of coupling wireless handset 20 to wired base 18 and of facilitating communication between wireless handset 20 and wired base 18 through this connection. Base interface 110 may represent any appropriate combination of hardware and/or software to allow wireless handset 20 to form a suitable connection, based on the configuration and capabilities of wireless handset 20 and wired base 18, between wireless handset 20 and wired base 18. As one example, base interface 110 may comprise metal contacts that couple to metal contacts of wired base 18 when wireless handset 20 is placed in or on a cradle portion of wired base 18. As another example, base interface 110 may comprise an antenna that allows wireless handset 20 to communicate with wired base 18 in a similar fashion to that which a conventional cordless phone communicates with its base.

Wireless interface 120 is capable of facilitating wireless communication between wireless handset 20 and one or more WLANs 16. Wireless interface 120 may, in general, include any appropriate combination of software and/or hardware to support wireless communication between wireless handset 20 and appropriate components of the relevant WLANs 16. In particular embodiments, wireless interface 120 may comprise an antenna, and any appropriate controlling logic, that is suitable to support wireless communication between wireless handset 20 and wired base 18 using the 802.11 or Bluetooth wireless communication protocols.

Processor 130 is operable to execute instructions associated with the functionality provided by wireless handset 20. Processor 130 may comprise a general purpose computer, dedicated microprocessor, or other processing device capable of communicating electronic information. Examples of processor 130 include application-specific integrated circuits (ASICs), field-programmable gate arrays (FPGAs), digital signal processors (DSPs) and any other suitable specific or general purpose processors.

Memory 140 stores processor instructions, handset configuration information 142 and/or other values, parameters, or information utilized by wireless handset 20 during operation. Memory 140 may represent any collection and arrangement of volatile or non-volatile, local or remote devices suitable for storing data. Examples of memory 140 include, but are not limited to, random access memory (RAM) devices, read only memory (ROM) devices, magnetic storage devices, optical storage devices, or any other suitable data storage devices.

User interface 150 allows user 100 to communicate with other users of communication devices 60 and to interact with wireless handset 20. User interface 150 may include any combination of hardware and/or software suitable to support communication between user 100 and users of communication devices 60 and/or interaction with wireless handset 20. Moreover, the particular components included in user interface 150 may depend on the features and functionality supported by wireless handset 20.

In the illustrated embodiment, user interface 150 includes a display 152, a navigation button 154, a keypad 156, a microphone 158, and a speaker 160. Speaker 160 generates audio signals based on information received from communication devices, such as voice data received from a particular communication device 60, or generated by wireless handset 20, such as audio prompts produced by wireless handset 20. Microphone 158 receives audio signals spoken or generated by user 100 and converts the audio signals to electronic information for use by wireless handset 20 or for transmission to appropriate components of WLANs 16. Display 152 represents any suitable hardware and controlling logic for visually presenting information to user 100. For example, display 152 may include a liquid crystal display (LCD). Navigation button 154 permits a user to indicate up, down, right, and left movements. Keypad 156 permits traditional numeric and special character entry by a user. Although the illustrated embodiment shows a particular configuration of components for interacting with user 100, wireless handset 20 may include additional display and input components and/or different configurations and types of components than are shown.

Figure 4:
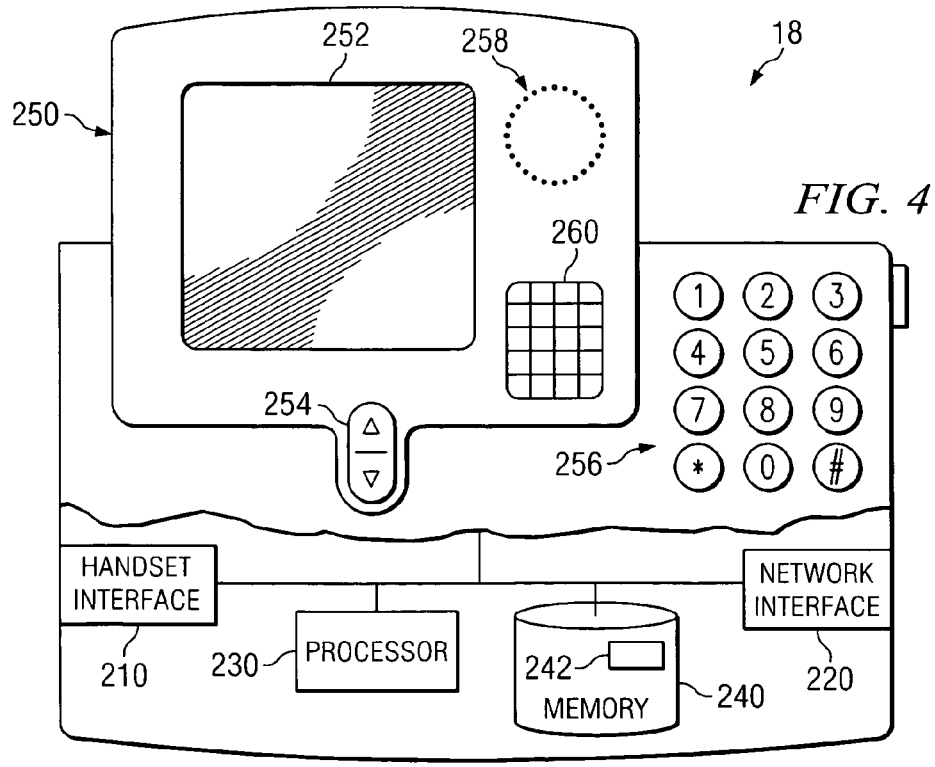
FIG. 4 illustrates contents of a particular embodiment of a wired base that may also be used for communication in the communication system shown in FIG. 1.

FIG. 4 is a block diagram illustrating the contents of wired base 18 according to particular embodiments. As shown, wired base 18 includes handset interface 210, network interface 220, processor 230, memory 240, and user interface 250. Although shown in FIG. 4 as physically discrete elements of wired base 18, any two or more of handset interface 210, network interface 220, processor 230, memory 240, and user interface 250 may represent portions of the same physical component and/or include shared components.

Handset interface 210 is capable of coupling wired base 18 to wireless handset 20 and facilitating communication between wired base 18 and wireless handset 20 through this connection. Handset interface 210 may represent any appropriate combination of hardware and/or software to allow wired base 18 to form a suitable connection, based on the configuration and capabilities of wired base 18 and wireless handset 20, between wired base 18 and wireless handset 20. As one example, handset interface 210 may comprise metal contacts that couple to metal contacts of wireless handset 20 when wireless handset 20 is placed in or on a cradle portion of wired base 18. As another example, handset interface 210 may comprise an antenna that allows wired base 18 to communicate with wireless handset 20 in a similar fashion to that which a conventional cordless phone base communicates with an associated cordless phone handset.

Network interface 220 is capable of facilitating communication between wired base 18 and an associated LAN 14. Network interface 220 may, in general, include any appropriate combination of software and/or hardware to support communication between wired base 18 and appropriate components of the relevant LAN 14. In particular embodiments, network interface 220 may comprise a Network Interface Card (NIC), and any appropriate controlling logic, that is suitable to support communication between wired base 18 and the associated LAN 14 using the Ethernet or Token Ring protocol.

Processor 230 is operable to execute instructions associated with the functionality provided by wired base 18. Processor 230 may comprise a general purpose computer, dedicated microprocessor, or other processing device capable of communicating electronic information. Examples of processor 230 include application-specific integrated circuits (ASICs), field-programmable gate arrays (FPGAs), digital signal processors (DSPs) and any other suitable specific or general purpose processors. Processor 230 may represent and/or include identical or different components from those represented by and/or included in processor 130.

Memory 240 stores processor instructions, base configuration information 242 and/or other values, parameters, or information utilized by wired base 18 during operation. Memory 240 may represent any collection and arrangement of volatile or non-volatile, local or remote devices suitable for storing data. Examples of memory 240 include, but are not limited to, random access memory (RAM) devices, read only memory (ROM) devices, magnetic storage devices, optical storage devices, or any other suitable data storage devices. Memory 240 may represent and/or include the identical or different components from those represented by and/or included in memory 230.

User interface 250 allows user 100 to communicate with other users of communication devices 60 and to interact with wired base 18. User interface 250 may include any combination of hardware and/or software suitable to support communication between user 100 and users of communication devices 60 and/or interaction between user 100 and wired base 18. Moreover, the particular components included in user interface 250 may depend on the features and functionality supported by wired base 18. In the illustrated embodiment, user interface 250 includes a display 252, a navigation button 254, a keypad 256, a microphone 258, and a speaker 260 that function in a similar manner to those described above with respect to FIG. 3.

Additionally, in particular embodiments, user interface 250 of wired base 18 may include one or more components similar to those included in user interface 150 of a particular wireless handset configured to operate with wired base 18. For example, in the illustrated embodiment, the user interface 250 of wired base 18 includes similar components to those included in the user interface 150 of the embodiment of wireless handset 20 that is illustrated in FIG. 3. As a result, in particular embodiments, user interface 250 of wired base 18 may provide additional features or possess advantages that supplement the features provided by the user interface 150 of wireless handset 20. For example, in particular embodiments, user interface 250 of wired base 18 may include a higher-quality display 252 or additional components to display information to user 100 in an enhanced manner while wireless handset 20 is coupled to wired base 18. As another example, user interface 250 of wired base 18 may include a keypad 256 having larger keys than keypad 156 of wireless handset 20, providing user 100 with greater ease-of-use when wireless handset 20 is coupled to wired base 18. In general, however, user interface 150 of wired base 18 may include components identical to those of user interface 250 or that differ from those of user interface 150 in any appropriate manner. Alternatively, wired base 18 may include no user interface 250, and user 100 may instead use components of user interface 150 while wireless handset 20 is coupled to wired base 18.

Figure 5:
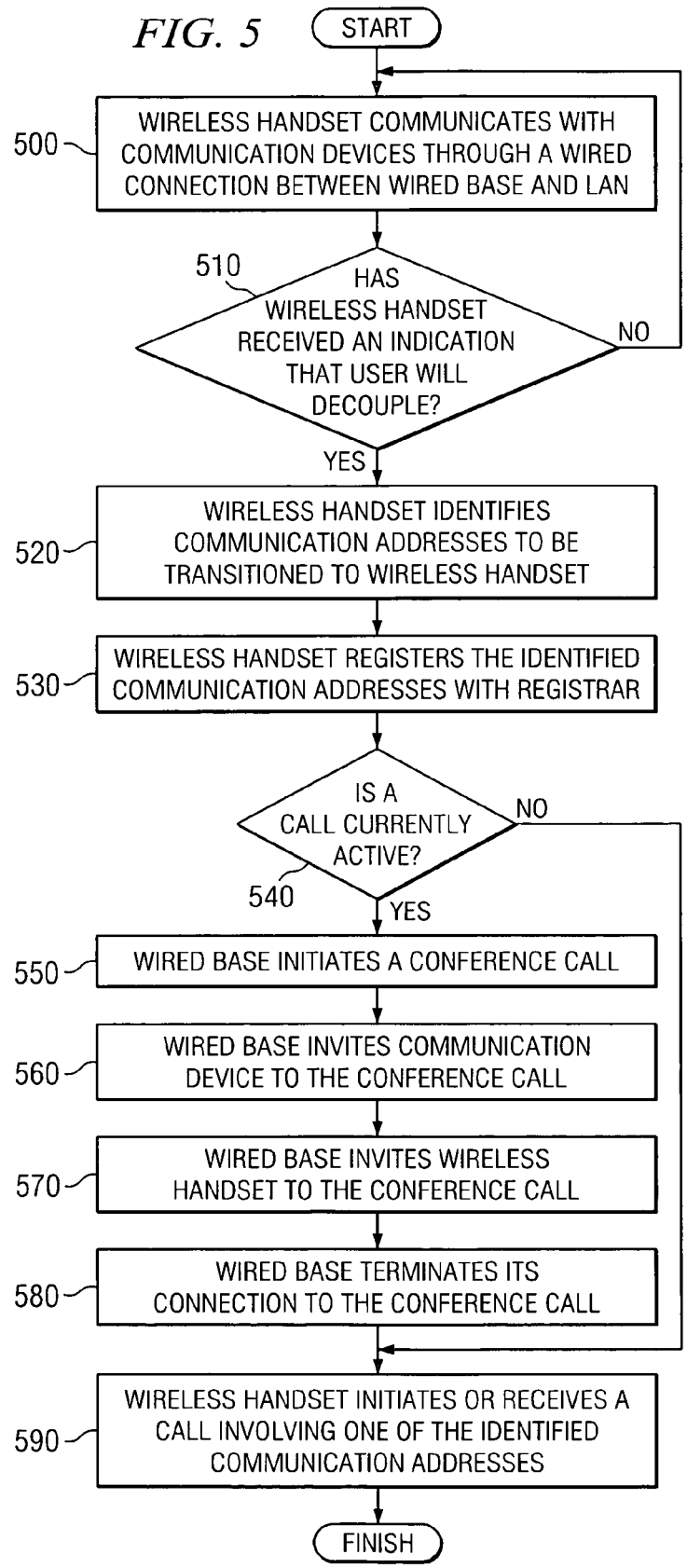
FIG. 5 is a flowchart describing example operation of particular embodiments of the wireless handset and the wired base when the wireless handset is decoupled from the wired base.

FIG. 5 is a flowchart illustrating example operation of particular embodiments of wireless handset 20 and wired base 18 as wireless handset 20 is decoupled from wired base 18. Although FIG. 5 describes operation of wireless handset 20 and wired base 18 in a particular embodiment of communication system 10 in which certain steps are performed by wireless handset 20 and particular steps are performed by wired base 18, the described steps may divided between wireless handset 20 and wired base 18 in any suitable manner, based on the configuration and capabilities of wireless handset 20 and wired base 18. Moreover, wired base 18 and/or wireless handset 20 may, in response to the decoupling of wireless handset 20 from wired base 18, take any appropriate steps in addition to those described.

The method begins at step 500 with wireless handset 20 coupled to wired base 18. While coupled to wired base 18, wireless handset 20 communicates with communication devices 60 through a wired connection between wired base 18 and a LAN 14 associated with wired base 18, as described above. At step 510, wired base 18 determines whether wired base 18 or wireless handset 20 has received an indication from user 100 that user 100 will be decoupling wireless handset 20 from wired base 18. For example in a particular embodiment, user 100 may, while wireless handset 20 is coupled to wired base 18, press a button on wireless handset 20 to indicate that user 100 will be decoupling wireless handset 20 from wired base 18. If wired base 18 determines that wired base 18 has not received an indication from user 100 that user 100 will be decoupling wireless handset 20 from wired base 18, operation returns to step 500.

If wired base 18 determines that wired base 18 has received an indication from user 100 that user 100 will be decoupling wireless handset 20 from wired base 18, wired base 18 and/or wireless handset 20 identify, at step 520, one or more communication addresses 34 to be transitioned to wireless handset 20. Wired base 18 and/or wireless handset 20 may identify these communication addresses 34 using any appropriate information available to wired base 18 or wireless handset 20. In particular embodiments, wired base 18 and wireless handset 20 each identify the communication addresses 34 to be transitioned to wireless handset 20 based on configuration information stored in their respective memories. At step 530, wireless handset 20 may register the identified communication addresses 34 with registrar 32. In particular embodiments, wireless handset 20 registers the identified communication addresses 34 by transmitting a SIP REGISTER message specifying the identified communication addresses 34 to registrar 32.

At step 540, wired base 18 may determine whether a call is currently active involving one of the registered communication addresses 34. If no call involving the registered communication addresses 34 is active, operation may continue at step 590. If a call is active involving one of the registered communication addresses 34, wired base 18 may execute one or more steps to transition the active call to wireless handset 20 while minimizing the disruption to the call. For example, if a call is active between wired base 18 and communication device 60*c*, wired base 18 may initiate a conference call on a conferencing element, such as a conferencing server 26, at step 550. Wired base 18 then invites communication device 60*c* to the conference call at step 560. In particular embodiments, wired base 18 invites communication device 60*c* to the conference call by transmitting a SIP REFER message to communication device 60*c* that identifies the conferencing element. At step 570, wired base 18 invites wireless handset 20 to the conference call. In particular embodiments, wired base 18 invites wireless handset 20 to the conference call by transmitting a SIP INVITE message to wireless handset 20 that identifies the conferencing element. At step 580, wired base 18 may terminate its connection to the conference call. As noted above, however, in embodiments that utilize this technique, wired base 18 may alternatively remain connected to the conference call until the active call is completed. More generally, however, wired base 18 and/or wireless handset 20 may use any appropriate techniques for transitioning the active call to wireless handset 20 as described above with respect to FIG. 1. At step 590, wireless handset 20 communicates with a communication device 60 using one of the registered communication addresses 34 by initiating, at wireless handset 20, a call involving one of the registered communication addresses 34; receiving, at wireless handset 20, a call involving one of the registered communication addresses 34; and/or continuing, at wireless handset 20, an ongoing call that involves one of the registered communication addresses 34 and that has been transitioned from wired base 18.

As noted above, FIG. 5 describes operation or wired base 18 and wireless handset 20 according to particular embodiments of these elements. Performance of the illustrated steps may be divided between wired base 18 and wireless handset 20 in any appropriate manner. Furthermore, any of the illustrated steps may be combined, modified or deleted where appropriate, and additional steps may also be added to the flowchart. Additionally, steps may be performed in any suitable order without departing from the scope of the invention.

Figure 6:
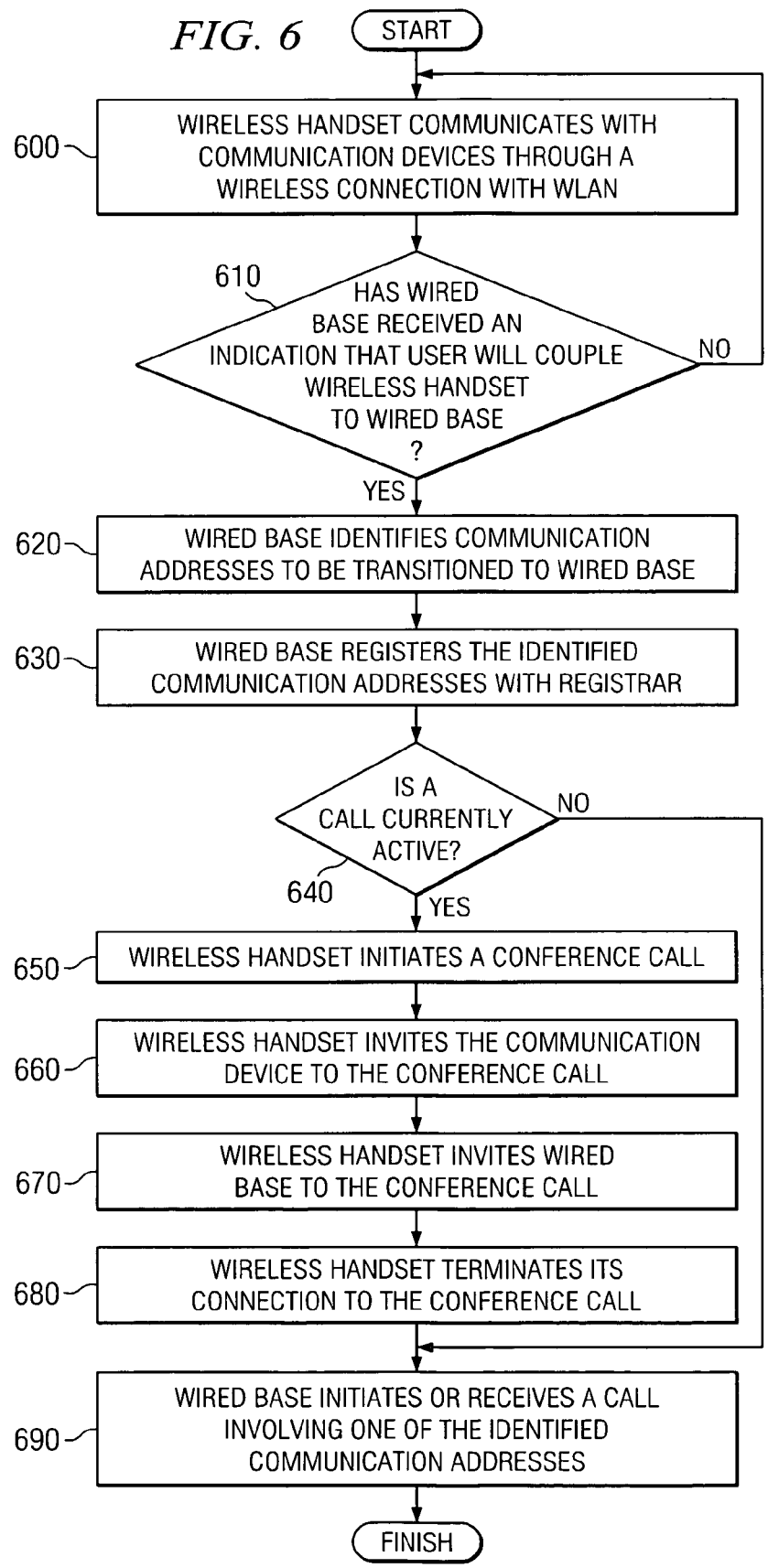
FIG. 6 is a flowchart describing example operation of particular embodiments of the wireless handset and the wired base when the wireless handset is coupled to the wired base.

FIG. 6 is a flowchart illustrating an example operation of particular embodiments of wireless handset 20 and wired base 18 as wireless handset 20 is coupled to wired base 18. Although FIG. 6 describes operation of wireless handset 20 and wired base 18 in a particular embodiment of communication system 10 in which certain steps are performed by wireless handset 20 and particular steps are performed by wired base 18, the described steps may divided between wireless handset 20 and wired base 18 in any suitable manner, based on the configuration and capabilities of wireless handset 20 and wired base 18. Moreover, wired base 18 and/or wireless handset 20 may, in response to the coupling of wireless handset 20 to wired base 18, take any appropriate steps in addition to those described.

The method begins at step 600 with wireless handset 20 uncoupled from wired base 18. While uncoupled from wired base 18, wireless handset 20 communicates with communication devices 60 through a wireless connection with appropriate components of a particular WLAN 16, as described above. At step 610, wireless handset 20 determines whether wired base 18 or wireless handset 20 has received an indication from user 100 that user 100 will be decoupling wireless handset 20 from wired base 18. For example in a particular embodiment, user 100 may, while wireless handset 20 is uncoupled from wired base 18, press a button on wireless handset 20 to indicate that user 100 will be coupling wireless handset 20 to wired base 18. If wireless handset 20 determines that wireless handset 20 has not received an indication from user 100 that user 100 will be coupling wireless handset 20 to wired base 18, operation returns to step 600.

If wireless handset 20 determines that wired base 18 has received an indication from user 100 that user 100 will be coupling wireless handset 20 to wired base 18, wireless handset 20 and/or wired base 18 identify, at step 620, one or more communication addresses 34 currently associated with wireless handset 20. Wireless handset 20 and/or wired base 18 may identify these communication addresses 34 using any appropriate information available to wireless handset 20 or wired base 18. In particular embodiments, wired base 18 and wireless handset 20 may each identify the communication addresses 34 currently associated with wireless handset 20 based on configuration information stored in their respective memories. At step 630 wired base 18 may register the identified communication addresses 34 with registrar 32. In particular embodiments, wired base 18 registers the identified communication addresses 34 by transmitting a SIP REGISTER message specifying the identified communication addresses 34 to registrar 32.

At step 640, wireless handset 20 may determine whether a call is currently active involving one of the identified communication addresses 34. If no call involving the identified communication addresses 34 is active, operation may continue at step 690. If a call is active involving one of the identified communication addresses 34, wireless handset 20 may execute one or more steps to transition the active call to wired base 18 while minimizing disruption of the call. For example, if a call is active between wireless handset 20 and communication device 60*c*, wireless handset 20 may initiate a conference call on a conferencing element, such as a conferencing server 26, at step 650. Wireless handset 20 then invites communication device 60*c* to the conference call at step 660. In particular embodiments, wireless handset 20 invites communication device 60*c* to the conference call by transmitting a SIP REFER message to communication device 60*c* that identifies the conferencing element. At step 670, wireless handset 20 invites wired base 18 to the conference call. In particular embodiments, wireless handset 20 invites wired base 18 to the conference call by transmitting a SIP INVITE message to wired base 18 that identifies conferencing server 260. At step 680, wireless handset 20 may terminate its connection to the conference call. As noted above, however, in embodiments that utilize this technique, wireless handset 20 may alternatively remain connected to the conference call until the active call is completed. More generally, however, wired base 18 and/or wireless handset 20 may use any appropriate techniques for transitioning the active call to wireless handset 20 as described above with respect to FIG. 1. At step 690, wired base 18 communicates with a communication device 60 using one of the registered communication addresses 34 by initiating, at wired base 18, a call involving one of the registered communication addresses 34; receiving, at wired base 18, a call involving one of the registered communication addresses 34; and/or continuing, at wired base 18, an ongoing call that involves one of the registered communication addresses 34 and that has been transitioned from wireless handset 20.

As noted above, FIG. 6 describes example operation of wired base 18 and wireless handset 20 according to particular embodiments of these elements. Performance of the illustrated steps may be divided between wired base 18 and wireless handset 20 in any appropriate manner. Furthermore, any of the illustrated steps may be combined, modified or deleted where appropriate, and additional steps may also be added to the flowchart. Additionally, steps may be performed in any suitable order without departing from the scope of the invention.

Thus, particular embodiments of wireless handset 20 and/or wired base 18 may provide flexible methods for communicating using wireless handset 20 and wired base 18 as wireless handset 20 is coupled and decoupled from wired base 18. Additionally, particular embodiments of wireless handset 20 and/or wired base 18 may support one or more techniques for transitioning active calls between wireless handset 20 and wired base 18 as wireless handset is coupled to and decoupled from wired base 18. As a result, particular embodiments of wireless handset 20 and/or wired base 18 may provide several operational benefits. Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for providing communication service, comprising:
   determining that a first call is active between a wired base and a communication device, the wired base coupled to a wireless handset, the wired base associated with a plurality of communication addresses such that calls placed to at least one of the plurality of communication addresses are routed to the wired base instead of the wireless handset and cause the wired base to indicate an incoming call to a user without using the wireless handset;
   placing the first call on hold by the wired base;
   associating the first call with a call identifier;
   detecting that the wireless handset has been decoupled from the wired base;
   in response to detecting that the wireless handset has been decoupled from the wired base, identifying one or more of the plurality of communication addresses to be associated with the wireless handset such that calls placed to the one or more communication addresses are routed to the wireless handset instead of the wired base;
   transmitting a registration to a registrar, the registration identifying the wireless handset and one or more of the identified communication addresses; and
   in response to detecting that the wireless handset has been decoupled from the wired base, retrieving the first call with the wireless handset based on the call identifier.

2. The method of claim 1, further comprising at least one of:
   initiating, at the wireless handset, a second call involving one of the communication addresses identified by the registration; and
   receiving, at the wireless handset, a third call involving one of the communication addresses identified by the registration.

3. The method of claim 1, further comprising associating, at the registrar, at least one of the communication addresses with the wireless handset.

4. The method of claim 1, further comprising:
   determining that a second call is active between the wired base and the communication device involving one of the communication addresses identified by the registration;
   initiating a conference call on a conferencing element;
   inviting the wireless handset to the conference call; and
   inviting the communication device to the conference call.

5. The method of claim 4, wherein:
   inviting the wireless handset to the conference call comprises transmitting a Session Initiation Protocol (SIP) INVITE message to the wireless handset; and
   inviting the communication device to the conference call comprises transmitting a SIP REFER message to the communication device, wherein the REFER message identifies the conferencing element.

6. The method of claim 1, further comprising:
   determining that a second call is active between the wired base and the communication device involving one of the communication addresses identified by the registration;
   identifying the wireless handset to the communication device; and
   initiating, using the communication device, a communication session between the communication device and the wireless device.

7. The method of claim 6, wherein identifying the wireless handset to the communication device comprises transmitting a Session Initiation Protocol (SIP) REFER message to the communication device, wherein the REFER message identifies the wireless handset.

8. The method of claim 1, further comprising:
   requesting a location of the wireless handset; and
   receiving the location of the wireless handset from the wireless handset.

9. The method of claim 1, further comprising:
   in response to detecting that the wireless handset has been decoupled from the wired base, accessing configuration information stored in the wireless handset; and
   configuring the wireless handset based on the configuration information.

10. A method for providing communication service, comprising:
    determining that a first call is active between a wireless handset and a communication device, the wireless handset decoupled from a wired base, the wireless handset associated with a plurality of communication addresses such that calls placed to at least one of the plurality of communication addresses are routed to the wireless handset;
    placing the first call on hold by the wireless handset;
    associating the first call with a call identifier;
    detecting that a wireless handset has been coupled to the wired base;
    in response to detecting that the wireless handset has been coupled to the wired base, identifying one or more of the communication addresses to be associated with the wired base such that calls placed to the one or more communication addresses are routed to the wired base instead of the wireless handset and cause the wired base to indicate an incoming call to a user without using the wireless handset;
    transmitting a registration to a registrar, the registration identifying the wired base and one or more of the identified communication addresses; and in response to detecting that the wireless handset has been coupled to the wired base, retrieving the first call with the wired base based on the call identifier.

11. The method of claim 10, further comprising at least one of:
initiating, at the wired base, a second call involving one of the communication addresses identified by the registration; and
receiving, at the wired base, a third call involving one of the communication addresses identified by the registration.

12. The method of claim 10, further comprising associating, at the registrar, at least one of the communication addresses with the wired base.

13. The method of claim 10, further comprising:
determining that a second call is active between the wireless handset and the communication device involving one of the communication addresses identified by the registration;
initiating a conference call on a conferencing element;
inviting the wired base to the conference call; and
inviting the communication device to the conference call.

14. The method of claim 13, wherein:
inviting the wired base to the conference call comprises transmitting a Session Initiation Protocol (SIP) INVITE message to the wireless handset; and
inviting the communication device to the conference call comprises transmitting a SIP REFER message to the communication device, wherein the REFER message identifies the conferencing element.

15. The method of claim 10, further comprising:
determining that a second call is active between the wireless handset and the communication device involving one of the communication addresses identified by the registration;
identifying the wired base to the communication device; and
initiating, using the communication device, a communication session between the communication device and the wired base.

16. The method of claim 15, wherein identifying the wired base to the communication device comprises transmitting a Session Initiation Protocol (SIP) REFER message to the communication device, wherein the REFER message identifies the wired base.

17. The method of claim 10, further comprising:
in response to detecting that the wireless handset has been coupled to the wired base, accessing configuration information stored on the wireless handset; and
configuring the wired base based on the configuration information.

18. A system for providing communication service, comprising:
a wired base coupled to a communication network, the wired base associated with a plurality of communication addresses such that calls placed to at least one of the plurality of communication addresses are routed to the wired base instead of a wireless handset coupled to the wired base and cause the wired base to indicate an incoming call to a user without using the wireless handset, the wired base operable to:
determine that a first call is active between the wired base and a communication device while the wired base is coupled to the wireless handset;
place the first call on hold; and
associating the first call with a call identifier; and
the wireless handset comprising:
a wireless interface operable to wirelessly transmit information to and wirelessly receive information from a wireless communication network; and
a wired interface operable to, when the wireless handset is coupled to the wired base, transmit information to and receive information from the communication network connected to the wired base; and
a processor operable to:
detect that the wireless handset has been decoupled from the wired base;
in response to detecting the wireless handset has been decoupled from the wired base, identify one or more of the plurality of communication addresses to be associated with the wireless handset such that calls placed to the one or more communication addresses are routed to the wireless handset instead of the wired base;
transmit a registration to a registrar using the wireless interface, wherein the registration identifies the wireless handset and one or more of the identified communication addresses; and
in response to detecting that the wireless handset has been decoupled from the wired base, retrieve the first call with the wireless handset based on the call identifier.

19. The system of claim 18, wherein the wireless handset is operable to perform at least one of:
initiating, at the wireless handset, a second call involving one of the communication addresses identified by the registration; and
receiving, at the wireless handset, a third call involving one of the communication addresses identified by the registration.

20. The system of claim 18, further comprising a communication device and wherein the wired base is further operable to:
determine that a second call is active between the wired base and the communication device involving one of the communication addresses identified by the registration;
initiate a conference call on a conferencing element;
invite the wireless handset to the conference call; and
invite the communication device to the conference call.

21. The system of claim 20, wherein the wired base is operable to:
invite the wireless handset to the conference call by transmitting a Session Initiation Protocol (SIP) INVITE message to the wireless handset; and
invite the communication device to the conference call by transmitting a SIP REFER message to the communication device, wherein the REFER message identifies the conferencing element.

22. The system of claim 18, further comprising a communication device and wherein:
the wired base is operable to:
determine that a second call is active between the wired base and the communication device involving one of the communication addresses identified by the registration; and
identify the wireless handset to the communication device; and
the communication device is operable to initiate a communication session between the communication device and the wireless device in response to the wired base identifying the wireless handset to the communication device.

23. The system of claim 22, wherein the wired base is operable to identify the wireless handset to the communication device by transmitting a Session Initiation Protocol (SIP)

REFER message to the communication device, wherein the REFER message identifies the wireless handset.

24. The system of claim 18, wherein:
the wired base is further operable to request a location of the wireless handset; and
the wireless handset is further operable to communicate information describing the location of the wireless handset to the wired base.

25. The system of claim 18, wherein the wireless handset is further operable to:
access configuration information stored in the wireless handset, in response to detecting that the wireless handset has been decoupled from the wired base; and
configure the wireless handset based on the configuration information.

26. A system for providing communication service, comprising:
a wireless handset associated with one or more communication addresses such that calls placed to at least one of the plurality of communication addresses are routed to the wireless handset, comprising:
a wireless interface operable to wirelessly transmit information to and wirelessly receive information from a wireless communication network;
a wired interface operable to, when the wireless handset is coupled to a wired base, transmit information to and receive information from a communication network coupled to the wired base; and
a processor operable to:
determine that a first call is active between the wireless handset and a communication device while the wireless handset is decoupled from the wired base;
place the first call on hold;
associate the first call with a call identifier;
the wired base coupled to the communication network, the wired base comprising:
a processor operable to:
detect that the wireless handset has been coupled to the wired base;
in response to detecting the wireless handset has been coupled to the wired base, identify at least one of the one or more communication addresses to be associated with the wired base such that calls placed to the one or more communication addresses are routed to the wired base instead of the wireless handset and cause the wired base to indicate an incoming call to a user without using the wireless handset;
transmit a registration to a registrar, wherein the registration identifies the wired base and one or more of the identified communication addresses; and
in response to detecting that the wireless handset has been coupled to the wired base, retrieve the first call based on the call identifier.

27. The system of claim 26, wherein the wired base is operable to perform at least one of:
initiating a second call involving one of the communication addresses identified by the registration; and
receiving a third call involving one of the communication addresses identified by the registration.

28. The system of claim 26, further comprising a communication device and wherein the wireless handset is operable to:
determine that a second call is active between the wireless handset and the communication device involving one of the communication addresses identified by the registration;
initiate a conference call on a conferencing element;
invite the wired base to the conference call; and
invite the communication device to the conference call.

29. The system of claim 26, wherein the wireless handset is operable to:
invite the wired base to the conference call by transmitting a Session Initiation Protocol (SIP) INVITE message to the wireless handset; and
invite the communication device to the conference call by transmitting a SIP REFER message to the communication device, wherein the REFER message identifies the conferencing element.

30. The system of claim 26, further comprising a communication device and wherein:
the wireless handset is operable to:
determine that a second call is active between the wireless handset and the communication device involving one of the communication addresses identified by the registration; and
identify the wired base to the communication device; and
the communication device is operable to initiate a communication session between the communication device and the wired base in response to the wired base identifying the wireless handset to the communication device.

31. The system of claim 30, wherein the wireless handset is operable to identify the wired base to the communication device by transmitting a Session Initiation Protocol (SIP) REFER message to the communication device, wherein the REFER message identifies the wired base.

32. The system of claim 26, wherein the wired base is operable to:
detect that the wireless handset has been coupled to the wired base;
access configuration information stored on the wireless handset, in response to detecting that the wireless handset has been coupled to the wired base; and
configure the wired base based on the configuration information.

33. A system for providing communication service, comprising:
means for determining that a first call is active between a wired base and a communication device, the wired base coupled to a wireless handset, the wired base associated with a plurality of communication addresses such that calls placed to at least one of the plurality of communication addresses are routed to the wired base instead of the wireless handset and cause the wired base to indicate an incoming call to a user without using the wireless handset;
placing the first call on hold by the wired base;
associating the first call with a call identifier;
means for detecting that the wireless handset has been decoupled from the wired base;
means for identifying one or more of the plurality of communication addresses to be associated with the wireless handset such that calls placed to the one or more communication addresses are routed to the wireless handset instead of the wired base, in response to detecting the wireless handset has been decoupled from the wired base;
means for transmitting a registration to a registrar, the registration identifying the wireless handset and one or more of the identified communication addresses; and means for retrieving the first call with the wireless handset based on the call identifier, in response to detecting that the wireless handset has been decoupled from the wired base.

34. A system for providing communication service, comprising:

means for determining that a first call is active between a wireless handset and a communication device, the wireless handset decoupled from a wired base, the wireless handset associated with a plurality of communication addresses such that calls placed to at least one of the plurality of communication addresses are routed to the wireless handset;

means for placing the first call on hold by the wireless handset;

means for associating the first call with a call identifier;

means for detecting that a wireless handset has been coupled to the wired base;

means for identifying one or more of the communication addresses to be associated with the wired base such that calls placed to the one or more communication addresses are routed to the wired base instead of the wireless handset and cause the wired base to indicate an incoming call to a user without using the wireless handset, in response to detecting that the wireless handset has been coupled to the wired base;

means for transmitting a registration to a registrar, the registration identifying the wired base and one or more of the identified communication addresses; and means for retrieving the first call with the wired base based on the call identifier in response to detecting that the wireless handset has been coupled to the wired base.

* * * * *